Patented July 14, 1936

2,047,574

UNITED STATES PATENT OFFICE

2,047,574

AZO-DYESTUFFS AND PROCESS OF MAKING SAME

Gérald Bonhôte and Jacob Danuser, Basel, Switzerland, assignors to Society of Chemical Industry in Basle, Basel, Switzerland No Drawing. Application November 17, 1931, Serial No. 575,681. In Switzerland December 1, 1930

23 Claims. (Cl. 260—76)

The present invention relates to the manufacture of new azo-dyestuffs which are useful for the most various purposes, particularly for the production of fast tints on vegetable and animal fibers. They may also be used for coloring varnishes, as acetate silk dyestuffs, or, in case they contain suitable groups, such as, for example, sulfonic groups, as wool dyestuffs dyeing in an acid bath. The invention comprises the process of making these dyestuffs, as well as the new dyestuffs themselves.

All these dyestuffs are obtained by combining any diazo-compounds with arylides, made by condensing primary aromatic amines containing up to two amino-groups with hydroxy-carboxylic acids of the benzene series, which are so substituted that they can couple with diazo-compounds in ortho-position to the OH-group. Among the dyestuffs obtained, those are particularly valuable which are made from unsulfonated diazo-compounds, and among these particularly those are again of importance for the production of fast tints on cotton, which are made by combining unsulfonated or uncarboxylated diazo-compounds with the diarylides of the general formula

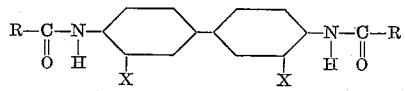

wherein the two X's stand for hydrogen, alkyl or alkoxy, and the two R's stand for the benzene nucleus of the said acid.

For the production of fast tints on animal fibers, for example wool or silk, not only the above cited arylides are suitable, but also those which derive from other diamines, such as, for example, from p-phenylenediamine, m-phenylenediamine, naphthalenediamines, such as 1,5-naphthalenediamine, m,m'-azoxyaniline, 3,3'-diaminomonobenzoyl-m-phenylenediamine, p,p'-diaminoazobenzene, diaminoanthraquinones, diaminodiarylether, 3,3'- or 2,2'-dichlorbenzidine, 4,4'-diaminostilbene, 4,4'-diaminodiphenylurea, diaminocarbazols, diaminoacridines, diaminodiphenylmethanes, diaminotriphenylmethanes, diaminoacridones, etc., or also from simple amines, such as aniline, the toluidines, the xylidines, or also from polynuclear monoamines, such as naphthylamines, aminonaphthols and the sulfonic acids thereof, dehydrothiotoluidine and the sulfonic acid thereof, aminobenzimidazols, aminoquinolines, etc. The new dyestuffs may also be produced on other materials, such as, for example, on artificial silks from regenerated cellulose, or on acetylated cellulose. They may also be produced without substrata, or on precipitated substrata, and may therefore be used in the form of lacquers or pigments. Finally, as already mentioned, also acid dyestuffs may be obtained if sulfonated diazo-compounds are used.

As hydroxycarboxylic acids of the benzene series which couple in ortho-position to the OH-group, p-cresotinic acid may above all be mentioned. Also other acids come into consideration, such as, for example, p-hydroxybenzoic acid, 3-methyl-4-hydroxy-1-benzoic acid, β-resorcylic acid, β-resorcylic acid-4-monomethylether, monobrominated β-resorcylic acid, etc.

With the new dyestuffs deep brown to reddish brown, yellow-brown, brown-orange to yellow tints are quite generally obtained, which may be distinguished by quite remarkable properties of fastness. They all correspond to the general formula

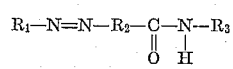

wherein $R_1$ stands for the radicle of any diazo-compound, $R_2$ for a benzene nucleus which contains an OH-group in ortho-position to the —N=N— group, and $R_3$ any aromatic complex consisting of a simple aromatic nucleus, such as a benzene nucleus, or a more complicated system, such as a naphthalene nucleus, or a heterocyclic system, or of complexes which may contain chromophores, particularly azo-chromophores. In a dry state the new dyestuffs are yellow-brown to dark colored powders.

The following examples illustrate the invention, the parts being by weight:—

Example 1

21.8 parts of para-nitraniline-sulfonic acid are diazotized as usual and the diazo-solution is introduced into one of 22.8 parts of para-cresotinic acid-anilide, 30 parts of caustic soda solution of 30 per cent. strength, 15 parts of soda ash and 200 parts of water. The dyestuff produced is precipitated rather quickly, and what remains may be salted out. The brown precipitate is filtered and dried. The dyestuff which corresponds very probably with the formula

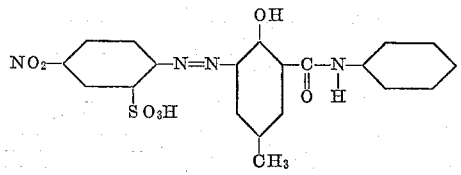

dyes wool in an acid bath brown tints, which become darker when after-chromed.

Example 2

15.2 parts of meta-nitro-para-toluidine are diazotized as usual. The clear diazo-solution is then mixed with an alkaline solution of 24.2 parts of para-cresotinic acid-ortho-toluidine. The red-brown precipitate, which is immediately produced and which corresponds very probably with the formula

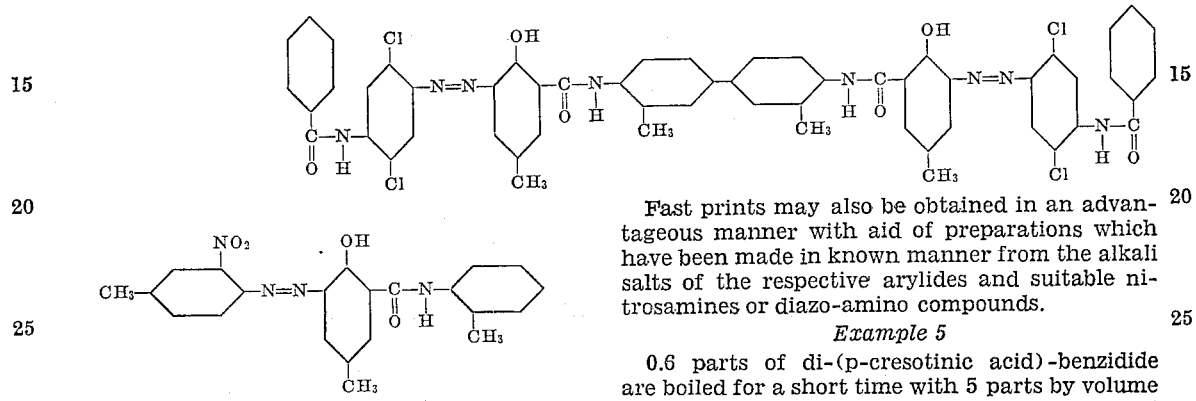

is filtered, washed and dried.

Example 3

One part of cotton yarn is impregnated at 20–25° C. for ½ hour in 20 parts of a liquor containing per litre 6 grams of di-(para-cresotinic acid)-dianisidide, 10 cc. of caustic soda solution of 34° Bé., 7 cc. of Turkey red oil, 6 cc. of formaldehyde solution of 40 per cent. strength and 10 grams of common salt; the yarn is then well wound off and developed in a solution, neutralized with sodium bicarbonate and containing per litre 10 grams of a diazo-preparation of 20 per cent. strength made from 4-chloro-2-amino-diphenyl-ether and 1,3,6-naphthalene-trisulfonic acid. The yarn is then rinsed and soaped. There is produced a very pure brown tint of good properties of fastness. The formula of the new dyestuff corresponds very probably with the formula

Example 4

The material to be printed is padded with an alkaline solution containing per litre 10 grams of di-(para-cresotinic acid)-tolidide. After drying, it is printed with a printing color which contains per kilo 8 grams of diazotized 1-amino-2,5-dichloro-4-benzoylaminobenzene. The pure yellow-brown dyeing develops quickly and is very fast. The formula of the new dyestuff corresponds very probably with the formula Fast prints may also be obtained in an advantageous manner with aid of preparations which have been made in known manner from the alkali salts of the respective arylides and suitable nitrosamines or diazo-amino compounds.

Example 5

0.6 parts of di-(p-cresotinic acid)-benzidide are boiled for a short time with 5 parts by volume of alcohol, 9 parts by volume of Turkey red oil 1:1, and 3 parts by volume of caustic soda solution of 36° Bé., and then introduced into a solution of 36 parts by volume of sulfite cellulose waste liquor of 50 per cent. strength, 18 parts of common salt in 900 parts of water. In this grounding bath 30 grams of a wool skein are treated for ¾ hour at 45° C., the material being frequently moved about. The wool is then well washed, slightly centrifuged, and introduced into a developing bath containing 4.5 grams of diazotized 4-nitro-o-phenetidine per litre, and neutralized with sodium bicarbonate. The wool skein is allowed to remain in the developing bath for 20 minutes, whereupon it is withdrawn, well rinsed and then acidified for 20 minutes at 80° C. in a bath containing 1.2 grams of sulfuric acid in the litre (corresponding to 4 per cent. sulfuric acid calculated on the weight of the wool). There is thus obtained a dark brown tint of good properties of fastness.

In the following table are set forth some of the tints which can be produced on the fiber by this invention:—

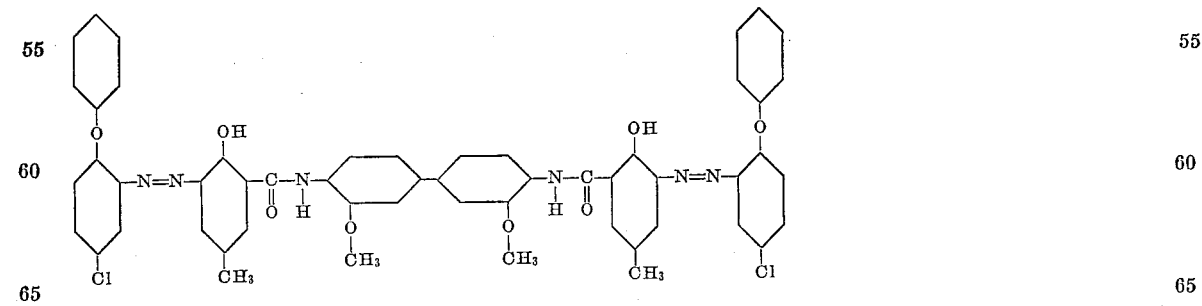

| | Diazo-component | Coupling component | Tint on cotton |
|---|---|---|---|
| 1 | 2,5-dichloraniline | Di-(para-cresotonic acid)-dianisidide | Brown |
| 2 | 1-amino-2-nitro-4-methyl-5-benzoyl-aminobenzene | do | Reddish dark brown |
| 3 | 4-chloro-ortho-anisidine | do | Khaki brown |
| 4 | 4-nitro-ortho-anisidine | do | Maroon brown |
| 5 | Meta-nitro-para-toluidine | do | Reddish dark brown |
| 6 | 4-chloro-nitraniline | do | Reddish maroon |
| 7 | 5-nitro-ortho-anisidine | do | Grey brown |
| 8 | Meta-nitro-para-phenetidine | do | Yellowish brown |
| 9 | Meta-nitro-para-anisidine | do | Do. |
| 10 | 1-amino-2-nitro-4-methoxy-5-benzoyl-aminobenzene | do | Olive |

| | Diazo-component | Coupling component | Tint on cotton |
|---|---|---|---|
| 11 | 4-chloro-4'-amino-3'-nitrodiphenyl-ether | Di-(para-cresotonic acid)-dianisidide | Brown |
| 12 | 1-amino-2-chloro-5-methoxybenzene | do | Yellowish brown |
| 13 | 4-nitro-ortho-phenetidine | do | Reddish brown |
| 14 | 4,5-dichloro-2-aminodiphenylether | do | Brown |
| 15 | 5-nitro-ortho-phenetidine | do | Reddish brown |
| 16 | Ortho-nitraniline | do | Do. |
| 17 | 5-nitro-ortho-toluidine | do | Do. |
| 18 | 4-chloro-2-amino-4'-methyldiphenyl-ether | do | Yellow brown |
| 19 | 4-aminobenzene-1-azodiphenylamine | do | Bordeaux brown |
| 20 | 1-amino-2,5-dichloro-4-benzoylaminobenzene | do | Yellow brown |
| 21 | 1-amino-2-methoxy-5-chloro-4-benzoylaminobenzene | do | Khaki-brown |
| 22 | 4-amino-4'-ethoxydiphenylamine | do | Reddish brown |
| 23 | Dianisidine | do | Maroon |
| 24 | Ortho-chloraniline | do | Brown |
| 25 | Meta-nitro-orthotoluidine | do | Reddish-brown |
| 26 | Para-nitraniline | do | Brown |
| 27 | 4-aminoazobenzene | do | Do. |
| 28 | 4-amino-5-methoxyazobenzene | do | Reddish brown |
| 29 | 4'-chloro-4-amino-5-methoxyazobenzene | do | Maroon |
| 30 | 4-chloro-2-aminodiphenylether | Di-(para-cresotinic acid)-benzidide | Brown |
| 31 | 4-chloro-2-amino-4'-methyldiphenyl-ether | do | Do. |
| 32 | 4,4'dichloro-2-aminodiphenylether | do | Do. |
| 33 | 4'aminobenzene-1-azodiphenylamine | do | Red-brown |
| 34 | 1-amino-2,5-dichloro-4-benzoylaminobenzene | do | Yellow-brown |
| 35 | Para-nitraniline | do | Brown |
| 36 | Ortho-nitraniline | do | Reddish-brown |
| 37 | 5-nitro-ortho-toluidine | Di-(para-cresotinic acid)-dibenzidide | Do. |
| 38 | Dianisidine | do | Maroon |
| 39 | Nitro-metaxylidine | do | Yellowish brown |
| 40 | 2,5-dichlor-aniline | do | Brown |
| 41 | 1-amino-2-nitro-4-methyl-5-benzoyl-aminobenzene | do | Red brown |
| 42 | 4-chloro-4'-amino-3'-nitrodiphenyl-ether | do | Reddish brown |
| 43 | 4-nitro-ortho-phenetidine | do | Brown |
| 44 | 4,5-dichloro-2-aminodiphenylether | do | Do. |
| 45 | 5-nitro-ortho-phenetidine | do | Dark brown |
| 46 | 4-nitro-ortho-anisidine | do | Brown |
| 47 | Meta-nitro-para-toluidine | do | Reddish dark brown |
| 48 | 4-chloro-2-nitraniline | do | Brown |
| 49 | 4-chloro-2-amino-4'-methyldiphenyl-ether | Di-(para-cresotinic acid)-tolidide | Do. |
| 50 | 4,4'-dichloro-2-aminodiphenylether | do | Do. |
| 51 | 1-amino-2,5-dichloro-4-benzoylamino-benzene | do | Yellowish brown |
| 52 | 4-nitro-ortho-toluidine | do | Reddish brown |
| 53 | 2,5-dichloraniline | do | Brown |
| 54 | 1-amino-2-nitro-4-methyl-5-benzoyl-aminobenzene | do | Dark brown |
| 55 | 4,5-dichloro-2-aminodiphenylether | do | Reddish brown |
| 56 | 5-nitro-ortho-toluidine | do | Brown |
| 57 | 4-chloro-4'-amino-3'-nitro-diphenylether | do | Reddish brown |
| 58 | 4-nitro-ortho-anisidine | do | Brown |
| 59 | Meta-nitro-para-toluidine | do | Dark brown |
| 60 | 4-chloro-2-nitraniline | do | Do. |
| 61 | 4-chloro-2-amino-4'-chlorodiphenylether | Di-(para-cresotinic acid)-dianisidide | Yellow brown |
| 62 | 4-chloro-2-aminodiphenylether | Di-(2,4-dihydroxybenzoic acid)-dianisidide | Brown |
| 63 | 5-chloro-2-toluidine | Di-(5-bromo-2,4-dihydroxybenzoic acid)-dianisidide | Bright brown |
| 64 | 2,5-dichloraniline | do | Brown |
| 65 | β-naphthylamine | Di-(para-cresotinic acid)-tolidide | Bright brown |

| | Diazo-component | Coupling component | Tint on wool |
|---|---|---|---|
| 66 | Ortho-nitraniline | Di-(para-cresotinic acid)-paraphenylenediamide | Brown |
| 67 | 2,5-dichloraniline | do | Yellow brown |
| 68 | Ortho-nitraniline | Di-(para-cresotinic acid)-azoxyaniline-m,m'-diamide | Brown |
| 69 | Meta-nitro-p-toluidine | Di-(para-cresotinic acid)-1,5-naphthylenediamide | Deep brown |
| 70 | Ortho-nitraniline | Di-(para-hydroxybenzoic acid)-benzidide | Yellow brown |
| 71 | Do | Di-(para-hydroxybenzoic acid)-dianisidide | Do. |
| 72 | Do | Di-(para-cresotinic acid)-3,3'-dichlorobenzidide | Brown |
| 73 | Do | Mixed diarylide from 1 molecular proportion of p-cresotinic acid and one molecular proportion of 2,3-hydroxynaphthoic acid and dianisidine. | Reddish brown |
| 74 | Do | Mixed diarylide from 1 molecular proportion of para-cresotinic acid and 1 molecular proportion of ortho-cresotinic acid and benzidine. | Brown. |
| 75 | Do | Arylide from para-cresotinic acid and 5-chlor-ortho-toluidide. | Do. |
| 76 | Do | Arylide from para-cresotinic acid and 2,5,7-amino-naphthol sulfonic acid. | Do. |
| 77 | Do | Arylide from para-cresotinic acid and dehydrothio-toluidine sulfonic acid. | Do. |
| 78 | Do | Arylide from para-cresotinic acid and α-naphthyl-amine. | Do. |
| 79 | 4-nitro-ortho-anisidine | do | Yellow brown |
| 80 | 4-chloro-2-toluidine | Arylide from para-cresotinic acid and para-phenetidine. | Do. |
| 81 | 2,5-dichloraniline | Arylide from para-cresotinic acid and dehydro-thio-toluidine. | Golden yellow |
| 82 | Meta-chloraniline | do | Do. |
| 83 | Do | Arylide from para-cresotinic acid and 4-amino-1,2-methyl-benzimidazol. | Reddish golden yellow |

The formula of dyestuff No. 1 is very probably

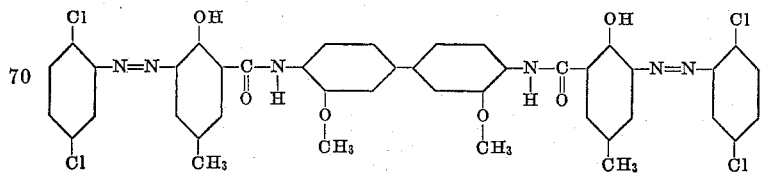

The formula of dyestuff No. 27 is very probably

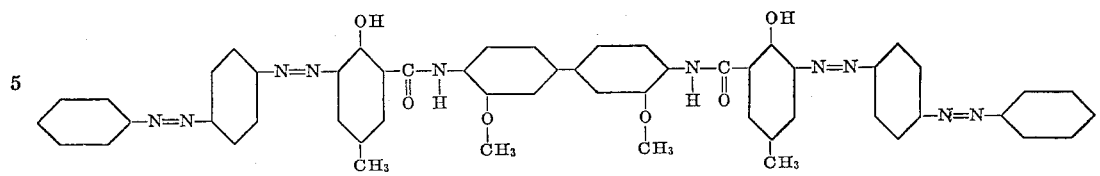

The formula of dyestuff No. 62 is very probably

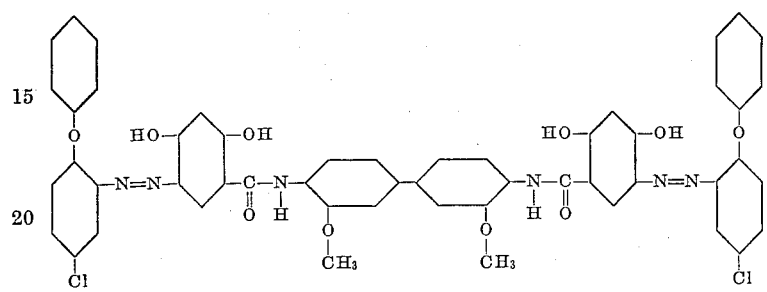

The formula of dyestuff No. 65 is very probably

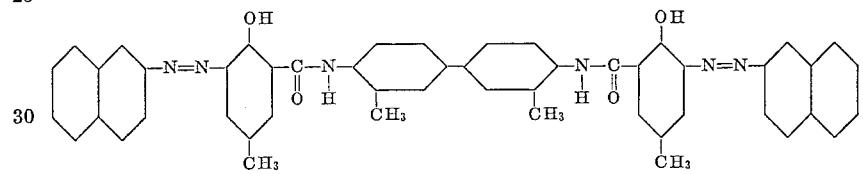

The formula of dyestuff No. 66 is very probably

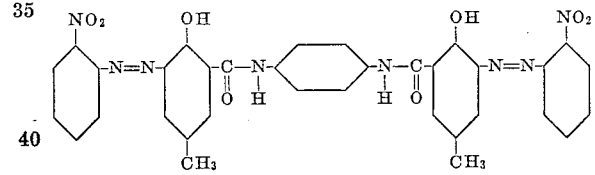

The formula of dyestuff No. 76 is very probably

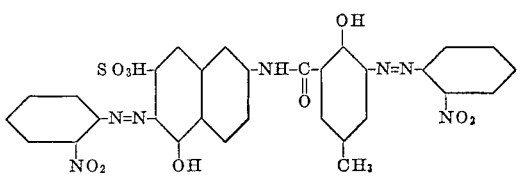

The formula of dyestuff No. 70 is very probably

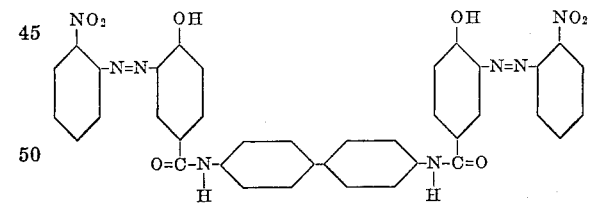

The formula of dyestuff No. 81 is very probably

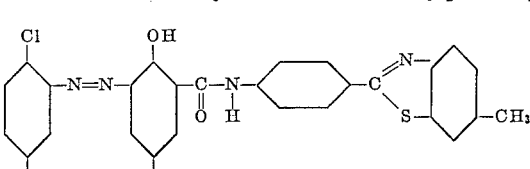

The formula of dyestuff No. 73 is very probably

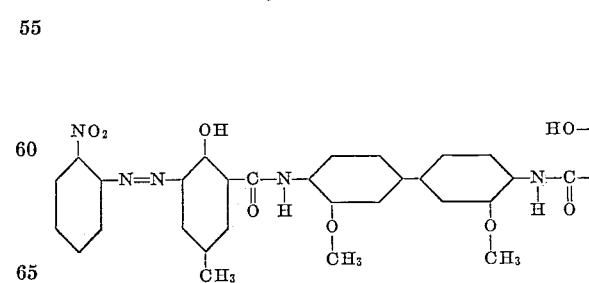

The formula of dyestuff No. 75 is very probably

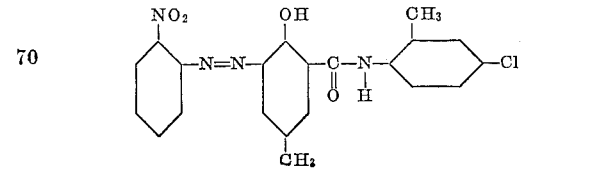

The formula of dyestuff No. 83 is very probably

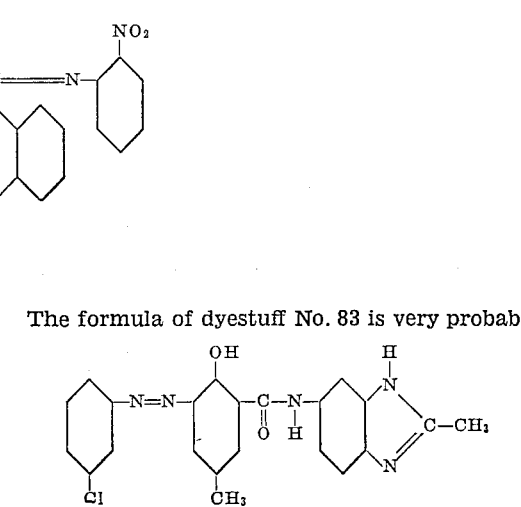

What we claim is:—

1. Process for the production of azo-dyestuffs consisting in coupling diazotized aromatic amino compounds with arylides made by condensing a hydroxycarboxylic acid of the following formula

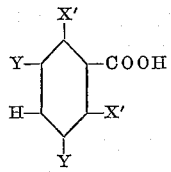

wherein one X' stands for OH, the Y in para position to the OH stands for alkyl or alkoxy, and the remaining X' and Y stand for hydrogen, with a primary aromatic amine of the benzene, naphthalene or diphenyl series which may contain up to two amino groups.

2. Process for the production of azo-dyestuffs consisting in coupling diazotized aromatic amino compounds with arylides made by condensing para-cresotinic acid with a primary aromatic amine of the benzene, naphthalene or diphenyl series which may contain up to two amino groups.

3. Process for the production of azo-dyestuffs consisting in coupling diazotized aromatic amino compounds with arylides made from one molecular proportion of an aromatic diamine of the benzene, naphthalene or diphenyl series and two molecular proportions of such aromatic hydroxycarboxylic acids as are capable of coupling with diazo compounds, of which at least one molecular proportion consists of a hydroxycarboxylic acid of the following formula

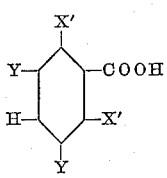

wherein one X' stands for OH, the Y in para position to the OH stands for alkyl or alkoxy, and the remaining X' and Y stand for hydrogen.

4. Process for the production of azo-dyestuffs consisting in coupling diazotized aromatic amino compounds with arylides made from one molecular proportion of an aromatic diamine of the benzene, naphthalene or diphenyl series, one molecular proportion of para-cresotinic acid, and one molecular proportion of an aromatic hydroxycarboxylic acid which is capable of coupling with diazo compounds.

5. Process for the production of azodyestuffs which comprises coupling a diazotized aromatic amino compound with an arylide made by condensing one molecular proportion of an aromatic diamine of the benzene, naphthalene and diphenyl series with two molecular proportions of 2-hydroxy-5-methyl benzoic acid.

6. Process for the production of azo-dyestuffs comprising coupling unsulfonated diazotized aromatic amino compounds with arylides made from one molecular proportion of a diamine of the general formula

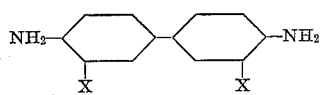

wherein X stands for hydrogen, alkyl or alkoxy, and two molecular proportions of a hydroxycarboxylic acid of the formula

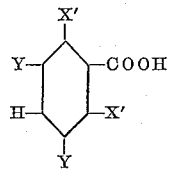

wherein one X' stands for OH, the Y in para position to the OH stands for alkyl or alkoxy, and the remaining X' and Y stand for hydrogen.

7. Process for the production of azodyestuffs comprising coupling diazotized unsulfonated primary aromatic mono-amines with arylides of the general formula

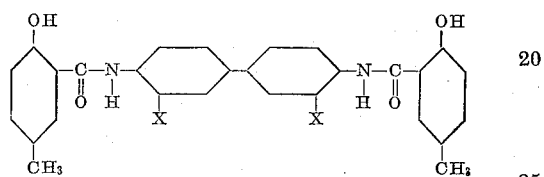

wherein the X stands for hydrogen, alkyl or alkoxy.

8. Process for the production of azo-dyestuffs comprising coupling diazotized unsulfonated o-amino-diphenyl ethers which are halogenated in the nucleus containing amino groups with arylides made from one molecular proportion of an aromatic diamine of the benzene, naphthalene or diphenyl series and two molecular proportions of such aromatic hydroxycarboxylic acids as are capable of coupling with diazo compounds, of which at least one molecular proportion consists of a hydroxycarboxylic acid of the formula

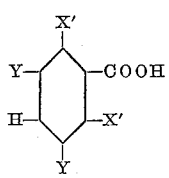

wherein one X' stands for OH, the Y in para position to the OH stands for alkyl or alkoxy, and the remaining X' and Y stand for hydrogen.

9. Process for the production of azo-dyestuffs, consisting in coupling diazotized unsulfonated o-amino-diphenyl ethers which are halogenated in the nucleus containing amino-groups, with arylides of the general formula

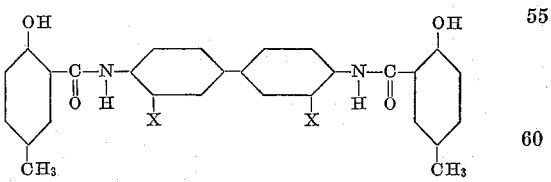

wherein X stands for hydrogen, alkyl or alkoxy.

10. Process for the production of an azo-dyestuff, consisting in coupling the diazotized 4-chloro-2-amino-diphenyl ether with the diarylide from one molecular proportion of benzidine and two molecular proportions of p-cresotinic acid.

11. Process for the production of an azo-dyestuff, consisting in coupling the diazotized 4,4'-dichloro-2-amino-diphenyl ether with the diarylide from one molecular proportion of benzidine and two molecular proportions of p-cresotinic acid.

12. Process for the production of an azo-dyestuff, consisting in coupling the diazotized 4-chloro-2-amino-diphenyl ether with the diarylide from one molecular proportion of tolidine and two molecular proportions of p-cresotinic acid.

13. The azodyestuff obtained by combining a diazotized aromatic amino compound and an arylamide of the following formula:

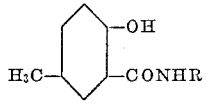

wherein R is a benzene, naphthalene or a diphenyl nucleus.

14. The azo-dyestuffs which correspond to the general formula

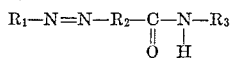

wherein $R_1$ stands for the radical of a diazotized aromatic amino compound, $R_2$ for a benzene nucleus containing an OH-group in ortho position to the —N=N— group, and $R_3$ an aromatic radical of the benzene, naphthalene or diphenyl series which may contain further azo groups, which dyestuffs are obtained by coupling diazotized aromatic amino compounds with arylides made by condensing hydroxy-carboxylic acids of the benzene series which are substituted by an alkyl or an alkoxy group in para position to the OH-group and which contain no other substituents, with primary aromatic amines of the benzene, naphthalene or diphenyl series which may contain up to two amino groups, and which dyestuffs in a dry state are yellow-brown to dark colored powders which dye the fiber fast yellow, orange, brown and dark brown tints.

15. The azo-dyestuffs which correspond to the general formula

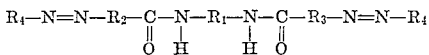

wherein $R_4$ stands for the radical of a diazotized aromatic amino compound, $R_2$ for a benzene nucleus containing an OH-group in ortho position to the —N=N— group, $R_1$ for an aromatic radical, $R_3$ for an aromatic nucleus containing at least one OH-group in ortho or para position to the —N=N— group, which dyestuffs are obtained by coupling diazotized aromatic amino compounds with arylides made from one molecular proportion of an aromatic diamine of the benzene, naphthalene or diphenyl series and two molecular proportions of aromatic hydroxycarboxylic acids capable of coupling with diazo compounds, of which at least one molecular proportion consists of a hydroxy-carboxylic acid of the benzene series which is substituted by an alkyl or an alkoxy group in para position to the OH-group and which contain no other substituents, and which dyestuffs in a dry state are dark brown powders and, when produced on the fiber, dye the same brown tints which are intensive.

16. The azo-dyestuffs which correspond to the general formula

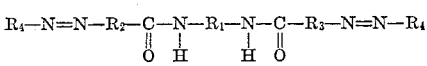

wherein $R_4$ stands for the radical of a diazotized aromatic amino compound, $R_2$ and $R_3$ for a benzene nucleus containing an OH-group in ortho position to the —N=N— group, $R_1$ for an aromatic radical, which dyestuffs are obtained by coupling diazotized aromatic amino compounds with arylides made from one molecular proportion of an aromatic diamine of the benzene, naphthalene and diphenyl series and two molecular proportions of a hydroxycarboxylic acid of the benzene series which is substituted by an alkyl or an alkoxy group in para position to the OH-group and which contains no other substituents, and which dyestuffs in a dry state are dark brown powders and, when produced on the fiber, dye the same brown tints which are intensive.

17. The azo-dyestuffs which correspond to the general formula

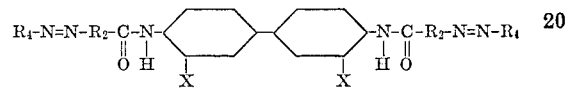

wherein $R_4$ stands for the radical of an unsulfonated diazotized aromatic amino compound, $R_2$ for a benzene nucleus containing an OH-group in ortho position to the —N=N— group, and X for hydrogen, alkyl or alkoxy, which dyestuffs are obtained by coupling unsulfonated diazotized aromatic amino compounds with arylides made from one molecular proportion of a diamine of the general formula

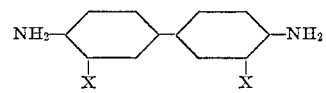

wherein X stands for hydrogen, alkyl or alkoxy, and two molecular proportions of a hydroxycarboxylic acid of the benzene series which is substituted by an alkyl or an alkoxy group in para position to the OH-group and which contains no other substituents, and which dyestuffs in a dry state are dark brown powders and, when produced on the fiber, dye the same brown tints which are intensive.

18. The azo-dyestuffs which correspond with the general formula

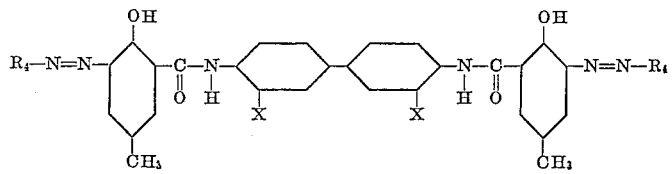

wherein $R_4$ stands for the radical of a diazotized unsulfonated primary aromatic mono-amine, and X for hydrogen, alkyl or alkoxy, which products are obtained by coupling diazotized primary aromatic monoamines with arylides of the general formula

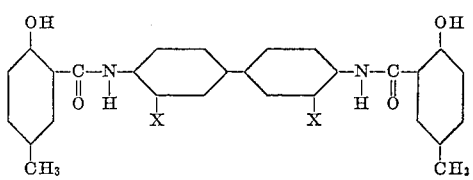

wherein X stands for hydrogen, alkyl or alkoxy, and which products, in a dry state, are dark brown powders, and, when produced on the fiber, dye the same brown tints which are intensive.

19. The azo-dyestuffs which correspond to the general formula

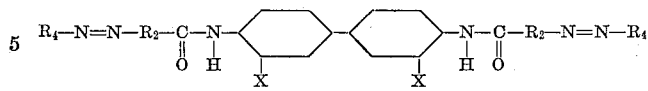

wherein $R_4$ stands for the radical of a diazotized o-amino-diphenylether which is halogenated in the nucleus containing amino-groups, $R_2$ for a benzene nucleus containing an OH-group in o-position to the —N=N— group, and X for hydrogen, alkyl or alkoxy, which dyestuffs are obtained by coupling diazotized o-aminodiphenylethers which are halogenated in the nucleus containing amino-groups with arylides made from one molecular proportion of a diamine of the general formula

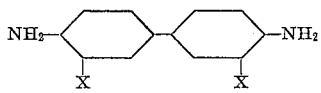

wherein X stands for hydrogen, alkyl or alkoxy and two molecular proportions of a hydroxycarboxylic acid of the benzene series, which is substituted by an alkyl or an alkoxy group in para-position to the OH-group and which contains no other substituents, and which dyestuffs, in a dry state, are dark brown powders, and, when produced on the fiber, dye the same brown tints which are intensive.

20. The azo-dyestuffs which correspond to the general formula

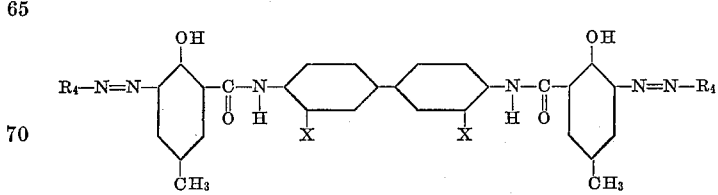

wherein $R_4$ stands for the radical of a diazotized o-aminodiphenylether which is halogenated in the nucleus containing amino-groups, and X for hydrogen, alkyl or alkoxy, which products are obtained by coupling diazotized o-aminodiphenylethers which are halogenated in the nucleus containing amino-groups with arylides of the general formula

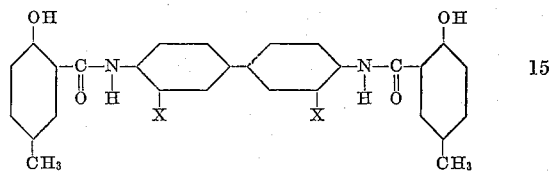

wherein X stands for hydrogen, alkyl or alkoxy, and which products, in a dry state, are dark brown powders, and, when produced on the fiber, dye the same brown tints which are intensive.

21. The azo-dyestuff which corresponds to the formula

which product is obtained by coupling the diazotized 4-chloro-2-aminodiphenylether with the arylide from one molecular proportion of benzidine and two molecular proportions of cresotinic acid, which product, when dry, is a brown powder, and, when produced on the fiber, dyes the same brown tints.

22. The azo-dyestuff which corresponds to the formula

which product is obtained by coupling the diazotized 4:4'-dichloro-2-aminodiphenylether with the arylide from one molecular proportion of benzidine and two molecular proportions of cresotinic acid, which product, when dry, is a brown powder, and, when produced on the fiber, dyes the same brown tints.

23. The azo-dyestuff which corresponds to the formula

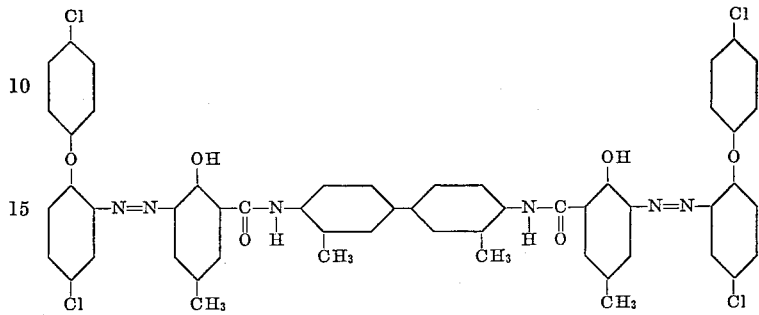

which product is obtained by coupling the diazotized 4:4'-dichloro-2-aminodiphenylether with the arylide from one molecular proportion of tolidine and two molecular proportions of cresotinic acid, which product, when dry, is a brown powder, and when produced on the fiber, dyes the same brown tints.

GÉRALD BONHÔTE.
JACOB DANUSER.